United States Patent [19]

Hunt

[11] 4,415,530

[45] Nov. 15, 1983

[54] NICKEL-BASE WELDING ALLOY

[75] Inventor: James P. Hunt, Huntington, W. Va.

[73] Assignee: Huntington Alloys, Inc., Huntington, W. Va.

[21] Appl. No.: 205,616

[22] Filed: Nov. 10, 1980

[51] Int. Cl.$^3$ .............................................. C22C 19/05
[52] U.S. Cl. .................................... 420/453; 420/443; 420/445; 420/448; 420/451; 420/454
[58] Field of Search ................... 75/171, 170; 148/32, 148/32.5

[56] References Cited

U.S. PATENT DOCUMENTS

| | | | |
|---|---|---|---|
| 3,046,108 | 7/1962 | Eiselstein | 75/171 |
| 3,113,021 | 12/1963 | Witherell | 75/171 |
| 3,181,970 | 5/1965 | Peck et al. | 117/205 |
| 3,619,183 | 11/1971 | Olson et al. | 75/171 |
| 4,042,383 | 8/1977 | Petersen et al. | 75/171 |
| 4,153,455 | 5/1979 | Eiselstein et al. | 75/171 |
| 4,174,213 | 11/1979 | Fukui et al. | 75/134 F |

FOREIGN PATENT DOCUMENTS

| | | |
|---|---|---|
| 2004465 | 3/1969 | France . |
| 2391286 | 5/1978 | France . |
| 267448 | 3/1950 | Switzerland . |

OTHER PUBLICATIONS

"The Effects on Weld Density of Alloying Elements in Nickel", Avt. Svarka, 1978, No. 9, G. S. Kuz'min et al. (Automatic Welding, vol. 31, No. 9, 1978) pp. 16 –19.

"The Effects of Alloying Elements on the Properties of Nickel-base Alloys, and of Welded Joints in Them, at Low Temperatures", K. A. Yushchenko et al, Avt. Svarka, 1978, No. 10, (Automatic Welding, vol. 31, No. 10, 1978) pp. 27–30.

*Primary Examiner*—R. Dean
*Attorney, Agent, or Firm*—Edward A. Steen; Raymond J. Kenny

[57] ABSTRACT

A welding alloy particularly directed to use as a wrought filler metal and contains selected percentages of chromium, molybdenum, manganese, columbium, magnesium, a number of trace elements and the balance essentially nickel.

3 Claims, 1 Drawing Figure

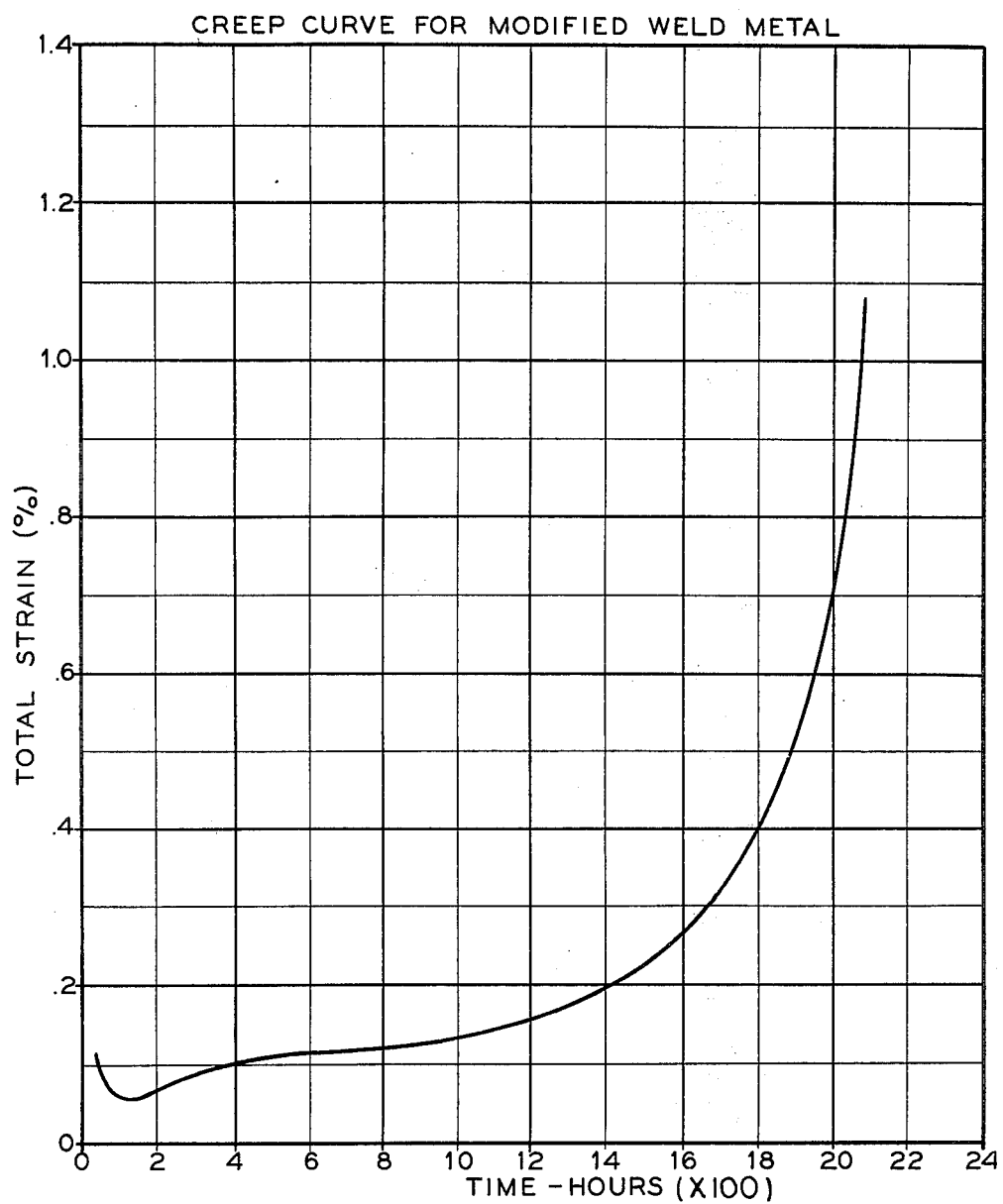

NICKEL-BASE WELDING ALLOY

TECHNICAL FIELD

This invention relates to the art of welding in general and more particularly to an alloy especially adapted for nickel-base alloy welding.

BACKGROUND ART

Nickel-base alloys have long enjoyed considerable usage as structural materials and have been found to be particularly advantageous when employed in high temperature environments such as those associated with nuclear reactors, jet engines and the like. These nickel alloys exhibit excellent high temperature strength characteristics as well as high resistance to the fluctuating stresses and shock experienced at elevated temperatures. Moreover, many nickel-base alloys are highly resistant to corrosion normally associated with a wide variety of hot gases and corrosive liquids.

In particular, the assignee of this invention produces a high temperature resistant nickel-base alloy called INCONEL alloy 618. (INCONEL is a trademark of the Inco family of companies.) See U.S. Pat. No. 4,153,455 for a complete description of the alloy and its properties. Suffice it to say, this alloy exhibits an excellent combination of high temperature strength and oxidation resistance characteristics. Indeed, it was initially developed to provide structural stability and weldability for High Temperature Gas Cooled Reactor (HTGR) applications.

There is a need in the art to weld oxidation-resistant nickel-base alloys under a variety of industrial conditions. As a filler wire, for example, any alloy selected should be suitable for welding with all major arc-welding processes, e.g., gas tungsten-arc, gas metal-arc, submerged-arc, and be capable of producing sound welded joints under conditions imposing severe restraint and difficult parameters for both thin and heavy section welds. It is also desirable that the alloy be suitable for use as a core wire in a covered electrode.

While sound welds may be made in many instances with matching composition filler material, industry prefers that continuous, high deposition-rate welding processes be employed; said processes requiring however, that the filler metal be readily workable to forms such as wire. Cast filler materials for high production rate welding processes are not economically feasible and it is essential that the filler material be at least hot workable in order to afford the advantages of continuous welding processes. More advantageously, the alloy should also be cold workable, allowing the alloy to be formed to thin cross-sections, e.g., wire, which is the form predominantly used in continuous high deposition-rate welding processes.

Inasmuch as INCONEL alloy 618 (as well as any other alloy) is ultimately joined to something, an attempt was made to develop a welding electrode using the alloy itself as the core wire. Accordingly, standard production INCONEL alloy 618 was utilized as the core wire for the electrode. In this manner, the problems and costs normally associated with producing a new electrode were, hopefully, to be eliminated.

The goal was to develop a welding electrode having a deposit that exhibited the same tensile stress, rupture and oxidation properties as those of the underlying wrought alloy product. Moreover, it was expected that the resulting electrode would exhibit good operability and produce sound weldments.

Initially, it was determined that such an electrode could be produced. However, as developmental work proceeded, it was discovered that an exact duplication of the underlying alloy composition did not produce defect-free weldments. Close examinations of the resulting deposits disclosed evidence of undesirable fissuring. Inasmuch as the alloy was originally developed for high pressure and temperature service applications, there was an urgent need to produce a welding alloy compatible with the superior strength and stability characteristics of INCONEL alloy 618.

Initially, for coated electrodes, modifications were made only in the flux; the alloy composition of the electrode remaining constant. However, it was soon apparent, that the composition of the core wire had to be modified in order to obtain acceptable, defect-free weldments, regardless of whether the wire was coated or not.

SUMMARY OF THE INVENTION

There is provided a welding electrode alloy which provides a sound, fissure-resistant weld deposit. The alloy is compatible with INCONEL alloy 618 in that it exhibits similar strength and stability properties.

The addition of manganese, molybdenum and columbium provides a composition that exhibits a resistance to fissuring which enables defect-free welds to be made with various welding processes.

BRIEF DESCRIPTION OF THE DRAWING

The FIGURE is a creep curve for one embodiment of the invention.

PREFERRED MODE FOR CARRYING OUT THE INVENTION

INCONEL alloy 618 was developed with the objective of providing high temperature strength, structural stability and weldability suitable for use in the High Temperature Gas Cooled Reactor (HTGR) program. The alloy has an approximate composition of 50–60% nickel, 22–28% chromium, 3–9% tungsten, 0.05% aluminum, 0.35% titanium and the balance consisting of assorted trace elements.

The invention claimed herein provides fissure-free welds, when used in gas tungsten-arc welding (commonly designated as GTAW or TIG) and gas metal-arc welding (commonly designated as GMAW or MIG) processes. The resulting welds exhibit corresponding room temperature tensile and stress rupture properties to those exhibited by INCONEL alloy 618. The alloy may be employed in both bare wire and coated electrode forms.

The chemical analyses (by weight percent) of the filler metal alloy is given in Table 1.

TABLE 1

| Element | Composition Range of the Filler Metal (by weight percent) | | | | |
|---|---|---|---|---|---|
| | Preferred | Bare Wire | | Welding Electrode | |
| | | Minimum | Maximum | Minimum | Maximum |
| Ni | Balance | 58.0 | 64.0 | 58.0 | 64.0 |
| Cr | 23.5 | 22.0 | 24.5 | 22.0 | 24.5 |
| W | 6.5 | 6.0 | 7.0 | 6.0 | 7.0 |
| Mo | 4.0 | 3.0 | 5.0 | 3.0 | 5.0 |
| Cb (+Ta) | 2.0 | 1.5 | 2.5 | 1.5 | 2.5 |
| Mn | 2.0 | 1.0 | 3.0 | 1.0 | 3.0 |

TABLE 1-continued

Composition Range of the Filler Metal (by weight percent)

| Element | Preferred | Bare Wire Minimum | Bare Wire Maximum | Welding Electrode Minimum | Welding Electrode Maximum |
|---|---|---|---|---|---|
| Fe | Low | — | 3.0 | — | 5.0 |
| C | 0.08 | 0.05 | 0.11 | 0.05 | 0.11 |
| S | Low | — | 0.015 | — | 0.015 |
| Si | Low | — | 0.50 | — | 0.75 |
| Cu | Low | — | 0.50 | — | 0.50 |
| Al | Low | — | 0.25 | — | 0.25 |
| Ti | 0.45 | 0.30 | 0.60 | — | 0.60 |
| Mg | 0.020 | 0.010 | 0.030 | — | 0.030 |
| Co | Low | — | 0.50 | — | 0.50 |
| P | Low | — | 0.015 | — | 0.020 |
| B | 0.002 | 0.001 | 0.005 | — | 0.005 |

After a number of experimental trials, it was determined that selected additions of manganese, molybdenum and columbium (niobium) to the underlying nickel, chromium and tungsten base alloy provided superior resistance to fissuring at the weld deposit site.

Manganese aids in the reduction of fissuring but in the interest of stress-rupture life, manganese should be limited to levels up to about 3%. Molybdenum was usually added to alloys in the past because it was believed that it merely imported a tolerance for other elements, i.e., boron, that might detrimentally affect the weldability characteristics of the resulting alloy. However, from testing the alloy, it is now believed that molybdenum also aids in the fissure resistant characteristics of the alloy. Columbium, like manganese, has been acknowledged to improve the fissure resistant properties of selected nickel-base alloys.

Table 2 highlights the average differences in composition between alloy 618 and the instant invention.

TABLE 2

Average Differences between the Invention and Alloy 618 (in weight percent)

| | Invention | Alloy 618 |
|---|---|---|
| C | 0.08 | 0.035 |
| Mn | 2.0 | Low |
| Fe | 2.0 | 14.0 |
| Ni | 60.0 | 55.0 |
| Cr | 23.5 | 23.0 |
| Mo | 4.0 | Low |
| Cb(+Ta) | 2.0 | Low |
| W | 6.5 | 6.0 |

As was discussed previously, it was first attempted to alter the flux coating about the electrode. However, it was quickly determined that the resulting deposits left much to be desired. Accordingly, a number of experimental electrodes and wires were prepared for testing. Table 3 lists the more promising experimental modified alloy electrode compositions.

HF heats 6947, 6987 and 6988 bracket the desired composition of the modification. These compositions were used to make gas metal-arc welds which were free from fissures. Gas tungsten-arc welds and coated electrode welds were also made successfully with HF heats 6987 and 6988.

Table 4 shows the results of testing three one hundred pound (45.36 kg) heats that were processed to 0.062" (0.15 cm) spooled wire and 0.125" (0.32 cm) straight lengths. Three processes were used to make the welds; gas tungsten-arc (GTAW), gas metal-arc (GMAW) and shielded metal-arc (SMAW) (coated electrode). Heat HF 6947 probably represents the lowest acceptable combination of chromium, molybdenum and columbium whereas heat HF 6988 probably represents the highest acceptable combination of these alloying elements. Heat HF 6987 represents an acceptable mid-range alloy.

TABLE 3

Experimental Heats (by weight percent)

| Control/Heat No. | C | Mn | Fe | S | Si | Cu | Ni | Cr | Al | Ti | Mg | Co | Mo | Cb + Ta | W | P | B |
|---|---|---|---|---|---|---|---|---|---|---|---|---|---|---|---|---|---|
| L-A 3259 | .06 | 3.93 | 16.05 | .008 | .36 | .04 | 49.43 | 19.49 | .01 | .06 | — | .22 | 3.82 | 1.95 | 4.54 | .011 | — |
| L-A 3332 | .06 | 3.48 | 12.84 | .007 | .39 | .04 | Bal. | 22.76 | .04 | .07 | — | .21 | 3.18 | 1.72 | 5.91 | .011 | — |
| L-A 3354 | .06 | 2.06 | 15.23 | .010 | .37 | .04 | Bal. | 19.45 | — | — | — | .22 | 4.27 | 2.50 | 4.57 | .011 | — |
| L-A 3355 | .06 | .06 | 15.61 | .012 | .35 | .04 | Bal. | 19.58 | — | — | — | .23 | 4.31 | 1.84 | 4.64 | .011 | — |
| L-A 3362 | .06 | 1.97 | 13.63 | .008 | .40 | .05 | Bal. | 23.22 | .03 | .08 | — | .22 | 3.79 | 1.97 | 4.39 | .011 | — |
| L-A 3384 | .06 | 2.12 | 13.35 | .008 | .24 | .03 | Bal. | 24.72 | .01 | .06 | — | .23 | .12 | .01 | 4.57 | .009 | — |
| L-A 3385 | .06 | 2.17 | 12.88 | .008 | .35 | .03 | Bal. | 24.21 | .02 | .08 | — | .22 | .12 | 2.07 | 4.53 | .009 | — |
| L-A 3390 | .06 | 1.81 | 13.64 | .011 | .27 | .05 | Bal. | 26.90 | .02 | .06 | — | .22 | 3.72 | .02 | 4.50 | .011 | — |
| L-A 3391 | .06 | 1.88 | 13.20 | .010 | .37 | .05 | Bal. | 26.58 | .02 | .07 | — | .21 | 3.59 | 1.85 | 4.36 | .012 | — |
| L-A 3410 | .15 | 1.89 | 13.54 | .009 | .38 | .05 | Bal. | 23.79 | .02 | .07 | — | .22 | 3.48 | 1.90 | 4.63 | .011 | — |
| L-A 3411 | .24 | 1.91 | 13.41 | .010 | .34 | .05 | Bal. | 24.75 | .01 | .08 | — | .22 | 3.60 | 1.95 | 4.52 | .012 | — |
| L-A 3412 | .06 | 1.75 | 13.12 | .009 | .41 | .05 | Bal. | 23.01 | .02 | .07 | — | .21 | 3.21 | 1.58 | 6.24 | .011 | — |
| L-A 3413 | .06 | 2.31 | 12.95 | .008 | .42 | .02 | Bal. | 22.86 | .03 | .07 | — | .21 | 2.98 | 1.57 | 6.18 | .011 | — |
| L-A 3433 | .08 | 1.82 | 13.61 | .010 | .38 | .06 | Bal. | 23.39 | .02 | .08 | — | — | 3.43 | 1.82 | 4.83 | .011 | — |
| L-A 3434 | .11 | 1.84 | 13.53 | .009 | .38 | .06 | Bal. | 23.60 | .01 | .08 | — | — | 3.48 | 1.86 | 4.85 | .011 | — |
| Y93A3 | .02 | .08 | 13.84 | .004 | .13 | .02 | 55.51 | 23.08 | .02 | .35 | .009 | .10 | .06 | <.01 | 6.08 | .010 | — |
| L-A 3440 | .10 | 3.55 | .71 | .007 | .27 | .03 | Bal. | 24.48 | — | — | — | — | 5.14 | 1.77 | 5.79 | .006 | — |
| HF3553 | .02 | 3.94 | .38 | .004 | .12 | .04 | 58.30 | 24.35 | <.01 | .10 | — | — | 4.33 | 2.11 | 6.23 | .001 | — |
| L-A 3462 | .06 | 2.06 | .99 | .008 | .20 | .12 | 62.70 | 22.49 | .01 | .08 | — | — | 3.74 | 1.57 | 6.06 | .005 | — |
| HF6857 | .07 | 1.91 | .10 | .003 | .04 | .14 | Bal. | 23.45 | .004 | .19 | — | .014 | 3.97 | 1.96 | 6.20 | .002 | — |
| L-A 3466 | .08 | 2.02 | 1.08 | .006 | .23 | .07 | 62.03 | 21.94 | .01 | .09 | — | — | 3.72 | 1.55 | 6.03 | .004 | — |
| HF6858 | .11 | 1.92 | .16 | .004 | .05 | .09 | Bal. | 23.40 | .005 | .25 | — | .014 | 4.00 | 1.98 | 6.52 | .003 | — |
| HV3567 | .07 | 1.90 | 1.20 | .004 | .07 | <.01 | Bal. | 22.96 | .12 | .45 | .005 | .37 | 3.73 | 2.14 | 6.06 | — | .002 |
| HV3569 | .06 | 1.96 | .22 | .003 | .09 | <.01 | Bal. | 22.97 | .37 | .39 | .022 | .02 | 4.10 | 1.13 | 6.44 | — | .002 |
| HV3570 | .07 | 1.94 | .18 | .004 | .08 | <.01 | Bal. | 23.25 | .30 | .38 | .001 | .02 | 4.13 | 2.79 | 6.46 | — | .002 |
| HV3571 | .06 | 1.97 | .12 | .004 | .07 | <.01 | Bal. | 23.03 | .03 | .42 | .003 | .02 | 3.10 | 2.06 | 6.48 | — | .002 |
| HV3572 | .06 | 1.98 | .10 | .003 | .06 | <.01 | Bal. | 23.06 | .02 | .48 | .009 | .02 | 4.92 | 1.98 | 6.52 | — | .001 |
| HF6947 | .04 | 1.94 | .32 | .006 | .07 | <.01 | Bal. | 22.08 | .01 | .29 | .010 | .01 | 3.37 | 1.46 | 5.77 | — | — |
| HF6987 | .06 | 1.98 | 1.79 | .005 | .06 | .04 | 59.96 | 23.54 | .02 | .40 | .025 | .02 | 3.90 | 1.75 | 6.06 | — | — |
| HF6988 | .10 | 2.03 | 1.02 | .004 | .06 | .01 | 59.50 | 23.89 | <.01 | .37 | .014 | .02 | 4.51 | 2.43 | 5.96 | — | — |
| L-A 4604 | .05 | 1.94 | 1.89 | .006 | .52 | .05 | 61.32 | 21.92 | .02 | .09 | — | .02 | 4.07 | 1.75 | 6.33 | — | — |

TABLE 3-continued

| Control/Heat No. | C | Mn | Fe | S | Si | Cu | Ni | Cr | Al | Ti | Mg | Co | Mo | Cb + Ta | W | P | B |
|---|---|---|---|---|---|---|---|---|---|---|---|---|---|---|---|---|---|
| | | | | | | Experimental Heats (by weight percent) | | | | | | | | | | | |
| L-A 4604A | .07 | 1.97 | 1.10 | .006 | .56 | .02 | 60.84 | 22.23 | .03 | .09 | — | .02 | 4.69 | 2.11 | 6.25 | — | — |

TABLE 4

Room Temperature Tensile and Stress Rupture Properties of Weldments

| Weld Metal | Process* | Room Temperature Tensile Properties | | | | Stress Rupture Life 1832° F./5000 psi (986° C./34.4 MPa) | |
|---|---|---|---|---|---|---|---|
| | | Yield Str. ksi (MPa) | Tensile Str. ksi (MPa) | Elong. % | Red. of Area % | Life Hrs. | Elong. % |
| HF6947 | GTA | — | — | — | — | 51.2 | 3.0 |
| HF6947 | GMA | 64.7 (446) | 103.3 (712) | 43.5 | 43.4 | 60.7 | 2.5 |
| HF6987 | GTA | 76.0 (524) | 116.1 (800) | 38.0 | 48.1 | 85.1 | 3.1 |
| HF6987 | GMA | 65.6 (452) | 109.8 (757) | 41.0 | 48.6 | 67.2 | 10.9 |
| L-A 4604 | SMA | 69.5 (479) | 111.5 (769) | 40.0 | 34.5 | 97.2 | 6.6 |
| HF6988 | GTA | 75.4 (520) | 117.4 (809) | 36.0 | 39.9 | 205.3 | 2.3 |
| HF6988 | GMA | 68.4 (472) | 114.5 (789) | 36.0 | 39.6 | 150.0 | 5.0 |
| L-A 4604A | SMA | 74.2 (512) | 118.8 (819) | 34.0 | 31.4 | 70.1 | 3.5 |

*GTA = Gas-Tungsten-Arc, GMA = Gas Metal-Arc, SMA = Shielded Metal-Arc.

The tensile strength ranged from 103.3 ksi (712 MPa) to 118.8 ksi (819 MPa). The stress rupture life ranged from 51.2 to 205.3 hours. The low levels of carbon, chromium, molybdenum, columbium and tungsten in HF 6947 were reflected in the low strength and rupture life of the heat. The high levels of these elements in HF 6988 increased its properties, and lowered the elongation to the 30% range. The shielded metal-arc results were borderline at 31.4%, and the bare wire welds were higher at 39.6% and 39.9%.

Inasmuch as an intermediate level heat (HV-3567) appeared to exhibit acceptable strength characteristics, further tests were conducted on it to determine its properties.

The impact strength of a gas tungsten-arc weld made with the intermediate composition HV 3567 was determined after exposure at 1500° F. (801° C.) and 1800° F. (968° C.) for 100 hours. The as-welded strength was 99.3 foot-pounds (135 joules). See Table 5. After exposure at 1500° F. (801° C.), the strength dropped to 88.8 ft-lbs (120 joules), and at 1800° F. (968° C.) it was 93.0 ft-lbs (126 joules). Evidently, the structural changes at 1500° F. (801° C.) are more damaging than at 1800° F. (968° C.), but the decrease in impact strength is considered minimal.

TABLE 5

Average Impact Strength of Exposed Heat HV 3567 Weld Deposits (GTA Welds - Charpy Vee Notch)

| Condition | Weld No. | Average Impact Results Foot-Pounds (Joules) |
|---|---|---|
| As-weld | 18210 | 99.3 (135) |
| 1500° F./100 hrs (801° C.) | 18211 | 88.8 (120) |
| 1800° F./100 hrs (968° C.) | 18212 | 93.0 (126) |

A creep-rupture test was performed on an all-weld-metal sample of heats HV 3567 and HV 3568 at 1832° F. (986° C.) and at 1500 psi (10.3 MPa). The figure shows the resulting strain curve of the sample under these test conditions. The resulting creep rate was 0.000055 inches/hr (0.014 mm/hr.)

The accelerated rate of strain which began after about 1500 hours may be undesirable in some instances. A corresponding phenomenon has also been observed in a few (but not all) commercial heats of INCONEL alloy 618. Although this still as yet unexplained occurrence is not considered debilitating, descretion may be advised under certain circumstances.

The room temperature tensile strength, stress-rupture life and creep rate of the modified alloy filler metal and core wire composition are comparable to the base metal properties. It should be appreciated that the invention may be employed as a filler metal for non-INCONEL alloy 618 applications as well.

While in accordance with the provisions of the statutes, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A welding alloy consisting essentially of from about 22% to about 24.5% chromium, from about 6% to about 7% tungsten, from about 3% to about 5% molybdenum, from about 1.5% to about 2.5% columbium, from about 1% to 3% manganese, up to about 5% iron, from about 0.05% to about 0.11% carbon, up to about 0.015% sulfur, up to about 0.75% silicon, up to about 0.5% copper, up to about 0.25% aluminum, up to about 0.6% titanium, up to 0.03% magnesium, up to about 0.5% cobalt, up to about 0.02% phosphorous, up to about 0.005% boron and the balance essentially nickel.

2. A welding alloy according to claim 1 in the form of a bare wire welding electrode.

3. A coated welding electrode formed from the alloy of claim 1.

* * * * *